(12) United States Patent
Ashcraft et al.

(10) Patent No.: US 9,405,322 B2
(45) Date of Patent: Aug. 2, 2016

(54) COMPUTER DEVICES AND METHODS OF PREVENTING DAMAGE TO A DISPLAY

(71) Applicant: HEWLETT-PACKARD DEVELOPMENT COMPANY, L.P., Houston, TX (US)

(72) Inventors: Britt C. Ashcraft, Tomball, TX (US); Eric Chen, Houston, TX (US); Sandie Ning Ning Cheng, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 14/229,346

(22) Filed: Mar. 28, 2014

(65) Prior Publication Data

US 2014/0211386 A1 Jul. 31, 2014

Related U.S. Application Data

(63) Continuation of application No. 13/233,932, filed on Sep. 15, 2011, now abandoned.

(51) Int. Cl.
*G06F 1/16* (2006.01)

(52) U.S. Cl.
CPC ............ *G06F 1/1656* (2013.01); *G06F 1/1637* (2013.01); *G06F 1/1662* (2013.01); *G06F 1/1679* (2013.01); *Y10T 29/49826* (2015.01)

(58) Field of Classification Search
CPC ....... H05K 7/14; G06F 1/1656; G06F 1/1637; G06F 1/1662
See application file for complete search history.

(56) References Cited

U.S. PATENT DOCUMENTS

| 5,394,306 | A | * | 2/1995 | Koenck | H05K 7/1417 174/544 |
| 5,568,357 | A | * | 10/1996 | Kochis | H05K 7/005 349/58 |
| 5,706,168 | A | * | 1/1998 | Erler | G06F 1/1616 361/679.34 |
| 6,781,825 | B2 | * | 8/2004 | Shih | G06F 1/1656 312/223.1 |
| 6,795,306 | B2 | * | 9/2004 | Jeffries | G06F 1/1616 248/632 |
| 7,232,960 | B2 | | 6/2007 | Matsumoto et al. | |
| 7,301,761 | B2 | * | 11/2007 | Merz | G02F 1/133308 248/694 |
| 7,349,199 | B2 | | 3/2008 | Tracy et al. | |
| 8,178,793 | B2 | * | 5/2012 | Morimoto | H04M 1/185 174/564 |
| 2006/0002066 | A1 | * | 1/2006 | Doczy | G06F 1/1656 361/679.09 |
| 2006/0058077 | A1 | * | 3/2006 | Langerhans | G06F 1/1616 455/575.1 |
| 2006/0152892 | A1 | * | 7/2006 | Matsumoto | G06F 1/1656 361/679.06 |
| 2006/0285284 | A1 | * | 12/2006 | Tracy | G06F 1/1616 361/679.27 |
| 2007/0025072 | A1 | * | 2/2007 | Liao | G06F 1/1616 361/679.21 |
| 2007/0076360 | A1 | * | 4/2007 | Deluga | G06F 1/1616 361/679.21 |
| 2009/0103257 | A1 | | 4/2009 | Maeda et al. | |
| 2009/0231805 | A1 | * | 9/2009 | Schlesener | B29C 45/1676 361/679.55 |
| 2013/0070405 | A1 | | 3/2013 | Ashcraft et al. | |

* cited by examiner

*Primary Examiner* — Zachary M Pape
*Assistant Examiner* — Douglas Burtner
(74) *Attorney, Agent, or Firm* — HP Inc. Patent Department

(57) ABSTRACT

An example computer device includes a keyboard body further including a keyboard deck and a keyboard. In addition, the computer device includes a display body further including a display, the display body being coupled to the keyboard body such that the computer device is foldable to a closed position. Further, the computer device includes a display protector attached to the keyboard body and disposed at the keyboard deck to protect the display by contact therewith. The display protector includes a plurality of separate, discrete portions, the plurality of portions extends along each side of the keyboard, and each of the plurality of portions contacts both the keyboard deck and the display when the computer device is in the closed position and a compressible load is applied to the computer device.

18 Claims, 5 Drawing Sheets

COMPUTER DEVICES AND METHODS OF PREVENTING DAMAGE TO A DISPLAY

CROSS-REFERENCE TO RELATED APPLICATIONS

This application is a continuation of U.S. patent application Ser. No. 13/233,932 filed Sep. 15, 2011, and titled "Computer Devices and Methods of Preventing Damage to a Display," which is hereby incorporated herein by reference in its entirety.

BACKGROUND

Computer devices may include as interfacing elements a keyboard and a display. Further, some of these computer devices may be designed according to a flip or clamshell form in order to facilitate usage and portability. For example, a computer device may include a keyboard body and a display body pivotably attached to each other along an edge. Thereby, the device is foldable from an open position to a closed position. In the open position, the device is operable by a user. In the closed position, the device is made more compact and the interfacing elements are protected in order to facilitate portability. Examples of such foldable computer devices include laptops (also referred to as notebook computers), cellular phones, personal digital assistants (PDAs), or portable DVD players.

Generally, when a foldable computer device is in the closed position, the display is placed opposite and at a relatively short distance from elements in the keyboard body, such as keys in the keyboard or the keyboard deck surrounding the keyboard. If a compressive load is applied to the closed device, those elements may contact the display. Such contact may cause damage to the display such as, for example, imprints or stains that may be difficult to remove.

BRIEF DESCRIPTION OF THE DRAWINGS

For a detailed description of exemplary embodiments of the invention, reference will now be made to the accompanying drawings in which.

DETAILED DESCRIPTION

In the foregoing description, numerous details are set forth to provide an understanding of the examples disclosed herein. However, it will be understood by those skilled in the art that the examples may be practiced without these details. Further, in the following detailed description, reference is made to the accompanying figures, in which various examples are shown by way of illustration. In this regard, directional terminology, such as "top," "bottom," "front," "back," "left," "right," etc., is used with reference to the orientation of the figures being described. Because disclosed components can be positioned in a number of different orientations, the directional terminology is used for purposes of illustration and is in no way limiting. Like numerals are used for like and corresponding parts of the various figures.

While a limited number of examples have been disclosed, those skilled in the art will appreciate numerous modifications and variations therefrom. It is intended that the appended claims cover such modifications and variations as fall within the true spirit and scope of the examples.

Figure 1:
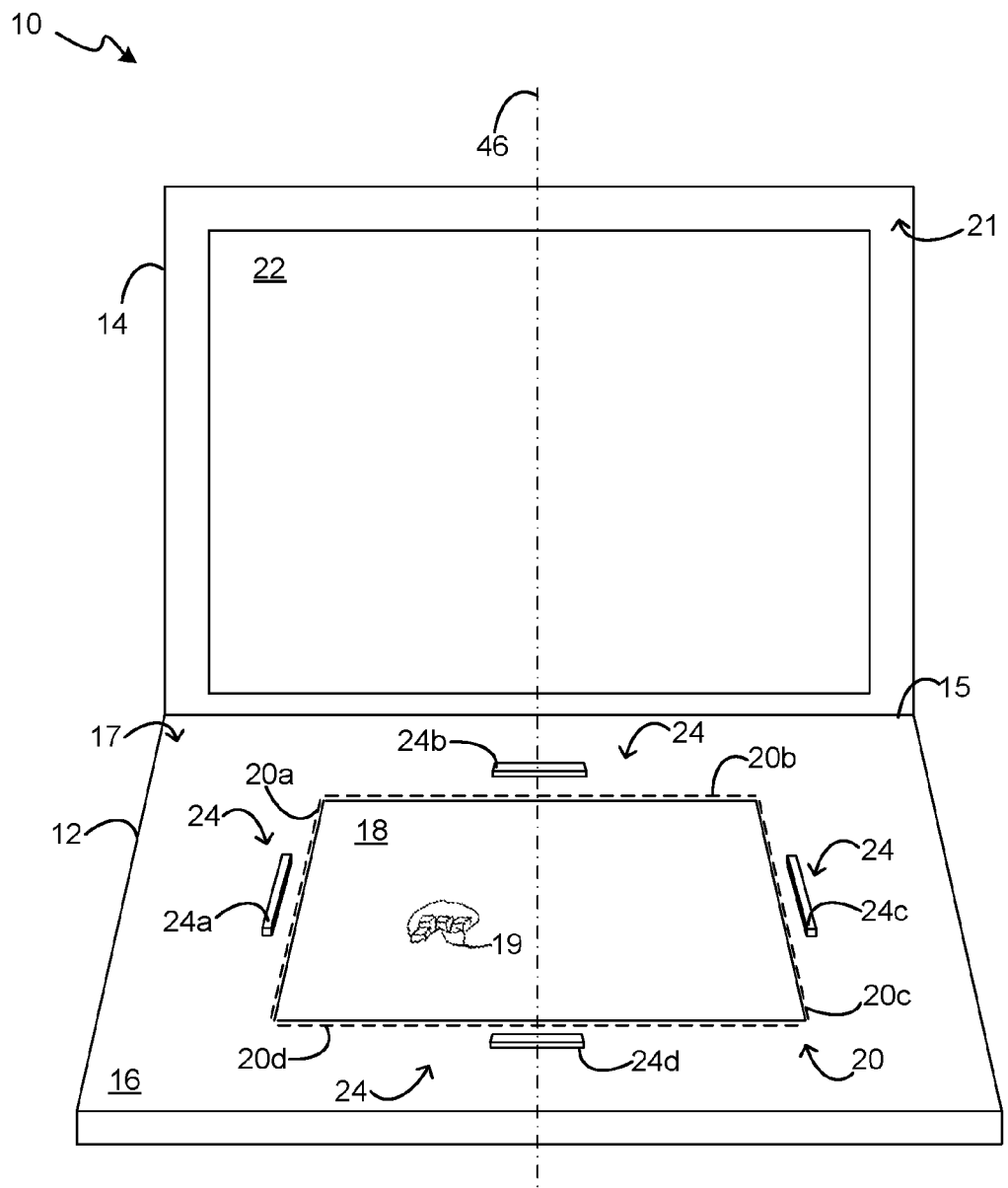
FIG. 1 is a schematic perspective view of a computer device according to an example.

FIG. 1 is a schematic perspective view of a computer device 10 according to an example. FIG. 1 illustrates computer device 10 in an open position. Computer device 10 is illustrated as a laptop but not limited thereto: computer device 10 may be any computer device with a display body closable upon a keyboard body such as a cellular phone, a personal digital assistant (PDAs), or a portable DVD player. As used herein, a laptop refers to a Personal Computer (PC) for mobile use. Computer device 10 includes a keyboard body 12 and a display body 14.

Figure 4:
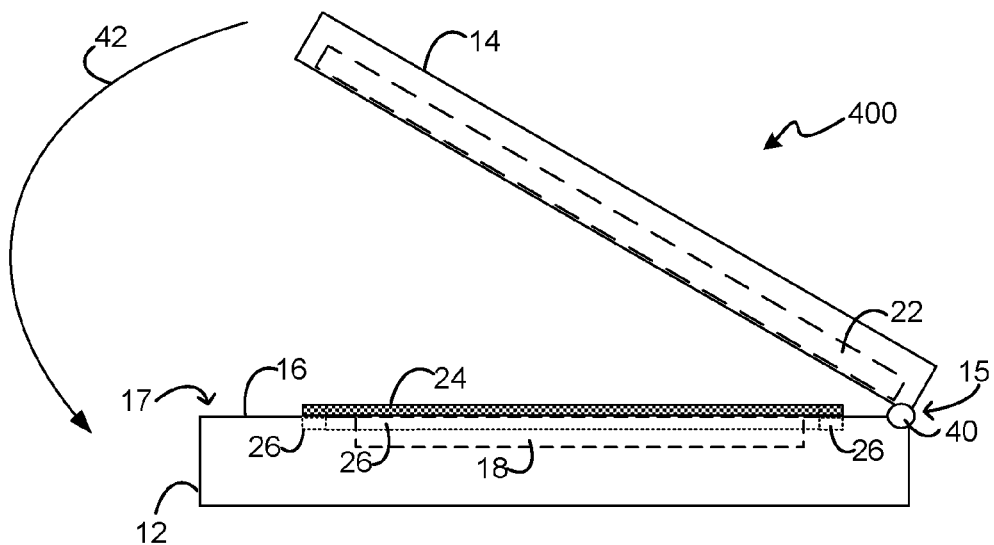
FIG. 4 is a schematic side view of a computer device according to an example.
Figure 5A:
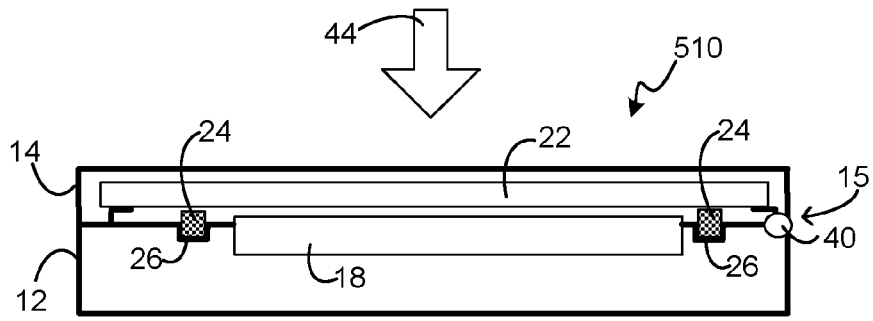
FIGS. 5A and 5B are schematic cross-sectional views of computer devices according to examples.
Figure 5B:
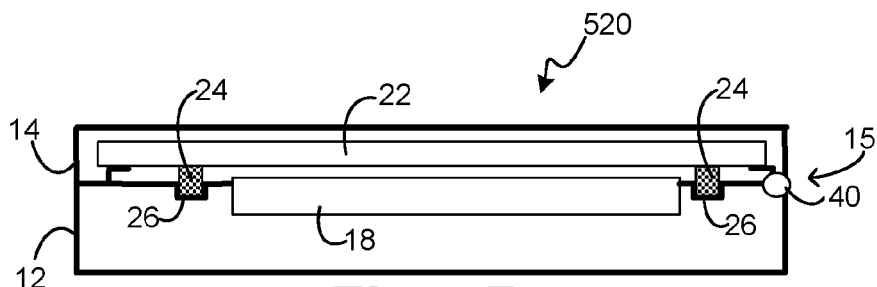

Display body 14 is coupled to keyboard body 12 such that computer device 10 is foldable to a closed position (see FIGS. 4 to 5B). For example, display body 14 may be hinged along an edge 15, so that display body may be rotated between an open position and a closed position. In the closed position an inner surface 17 of keyboard body 12 is adjacent to an inner surface 21 of display body 14. It will be understood that display body 14 may be coupled to keyboard body 12 differently as illustrated in figures herein. For example, display body 14 may be coupled to keyboard body 12 by hinging both bodies to a chassis (not shown) of computer device 10.

Keyboard body 12 includes a keyboard deck 16 at an inner surface 17. It will be understood that, as used herein, inner surface 17 of keyboard body 12 refers to the surface thereof which is disposed to be adjacent to display 22 when computer device 10 is in a closed position. Keyboard deck 16 surrounds a keyboard 18 which includes a plurality of keys 19. As used herein, a keyboard refers to a collection of keys or buttons surrounded by a keyboard deck and configured to interface a user with computer device 10. Keyboard 18 may be any arrangement of alphabetic and/or numeric keys such as a QWERTY, a Dvorak keyboard, or a phone keyboard layout. Keyboard 18 may include separate numeric keyboards and/or functional keyboards such as a numeric keypad, function keys, or cursor control keys. Keyboard 18 may be arranged with different shapes such as, but not limited to, a quadrilateral shape or a polygonal shape with any number of line segments. Keyboard 18 has four sides 20a, 20b, 20c, 20d corresponding to the sides of a quadrilateral region 20 enclosing keyboard 18.

Display body 14 includes a display 22. Display 22 may be a Liquid-Crystal-Display (LCD), a touchscreen, or any other screen in a computer device. When computer device 10 is closed, display 22 is placed adjacent to and opposite keyboard 18 and keyboard deck 16 (see FIGS. 3 to 4B). Further, display 22 may undesirably contact elements at inner surface 17 if a sufficiently high force is applied to computer device 10 (see FIG. 5B). Thereby, display 22 may be damaged, e.g., by imprints or stains that may be difficult to remove.

Systems and methods herein facilitate preventing damage to display 22. In examples herein, a display protector 24 is attached to keyboard body 12 at keyboard deck 16 to protect the display by contact therewith. Further, display protector 24 may contact display 22 when computer device 10 is closed or when a sufficiently high compressible force is applied to computer device 10. Display protector 24 includes portions 24a, 24b, 24c, 24d in the neighborhood of each side 20a, 20b, 20c, 20d of keyboard 18. In the illustrated example, a left portion 24a is in the neighborhood of left side 20a, an upper portion 24b is in the neighborhood of upper side 20b, a right portion 24c is in the neighborhood of right side 20c; and a bottom portion 24d is in the neighborhood of 20d.

Display protector 24 prevents that display 22 may contact other elements disposed at inner surface 17 of keyboard body 12 such as keyboard 18 and/or keyboard deck 16. It should be noted that a display protector including portions only at some sides of keyboard 18 may provide an insufficient protection to display 22. In contrast thereto, display protector 24 provides protection at each side of keyboard 18. Display protector 24 prevents damage to display 22 in that area even if display 22 is flexed in an area close to edge 15.

In the example illustrated in the FIG. 1, portions of display protector 24 are disposed on keyboard deck 16. By way of example, a portion of display protector 24 may be disposed at a distance between 0.1 cm and 3 cm from keyboard 18, such as 0.5 cm. In some examples herein and as illustrated in the figures, display protector 24 may be provided adjacent to keyboard 18, i.e., without any other functional element of computer device 10 (e.g., a trackpad) provided between display protector 24 and keyboard 18. Thereby, it is further facilitated preventing contact of display 22 with keyboard 18, since display protector 24 supports display 22 in areas closed to keyboard 18. By way of example, display protector 24 may include an elongated portion having a width between 0.5 mm and 3 mm, such as 2 mm.

As illustrated in the Figures, portions of display protector 24 may extend along sides of keyboard 18. The greater the length the portions of display protector 24 extend along sides of keyboard 18, the greater the protection of display 22 becomes. Display protector 24 may extend along at least 50% (or, more particularly, at least 80%) of an external perimeter of keyboard 18. That is, portions of display protector 24 may extend along sides of quadrilateral region 20 facing at least 50% (or, more particularly, at least 80%) of its perimeter. For example, individual portions of display protector 24 (e.g., portions 24a, 24b, 24c, 24d) may extend along at least 50% of respective sides of keyboard 18. In the examples depicted in FIG. 1 and FIGS. 2A and 2B, display protector 24 is formed by separated portions (e.g., portions 24a, 24b, 24c, 24d.) In some examples herein, display protector 24 is continuously formed so as to continuously surround keyboard 18, as illustrated in respect to FIGS. 2C and 3.

According to some example herein, display protector 24 is resilient. Thereby, display protector may adequately absorb loads or impacts that may damage display 22. Further, a resilient display protector is less likely to cause damage to display 22 than a protector made of non-resilient material. Display protector 24 may be composed of an elastomeric material. For example, display protector 24 may be composed of rubber. A particular elastomeric material may be chosen to be sufficiently soft so that damage to display 22 can be avoided, but sufficiently rigid so that contact of display 22 with other elements of computer device 10 can be avoided. If display protector 24 continuously surrounds keyboard 18, it may be formed as a single piece, e.g., as a rubber ring. A single piece display protector facilitates assembly of computer device 10, since it may be attached to keyboard deck 16 in a single step.

Figure 2:
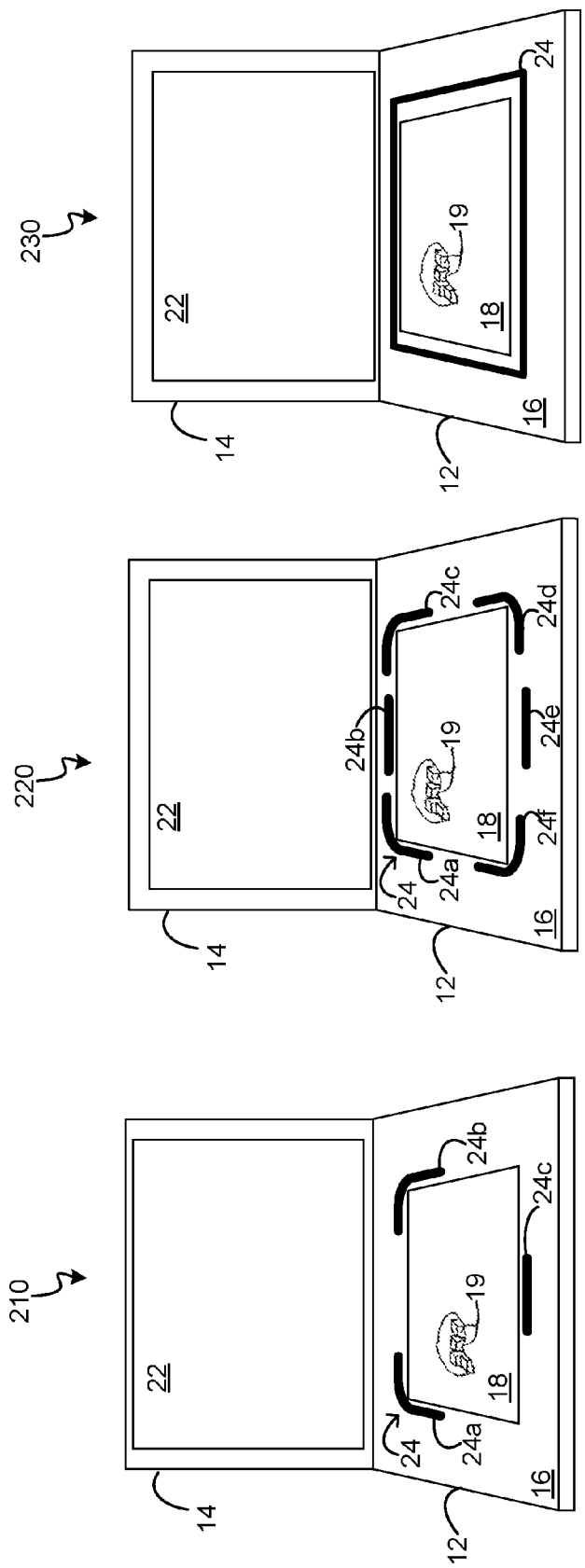
FIGS. 2A to 2C are schematic perspective views of computer devices according to examples.

As shown in FIG. 1, display protector 24 may include separated portions, each portion continuously extending facing one side of keyboard 18: a left portion 24a extends along left side 20a of keyboard 18; an upper portion 24b extends along upper side 20b of keyboard 18; a right portion 24c extends along right side 20c of keyboard 18; and a bottom portion 24d extends along bottom side 20d of keyboard 18. It will be understood that alternative arrangements of display protector 24 relative to keyboard 18 are contemplated. FIGS. 2A to 2C are schematic perspective views of computer devices according to examples that illustrate some of the contemplated arrangements.

FIG. 2A illustrates an arrangement in which a display protector 24 in s computer device 210 includes three separated portions 24a, 24b, 24c. According to some examples, and as illustrated in the Figure, display protector 24 may include a portion that continuously extends facing two or more sides of keyboard 18, such as separated portions 24a, 24b: separated portion 24a is located at the left-upper corner of keyboard 18; and separated portion 24b is located at the right-upper corner of keyboard 18. Display protector 24 in computer device 210 further includes a bottom portion 24d extending along the bottom side of keyboard 18.

FIG. 2B illustrates an arrangement in which a display protector 24 in a computer device 220 includes six separated portions 24a, 24b, 24c, 24d, 24e, 24f. According to some examples, and as illustrated in the Figure, display protector 24 may include portions at each corner of keyboard 18 continuously extending facing two sides of keyboard 18, such as separated portions 24a, 24c, 24d, 24f: separated portion 24a is located at the left-upper corner of keyboard 18; separated portion 24c is located at the right-upper corner of keyboard 18; separated portion 24d is located at the right-bottom corner of keyboard 18; and separated portion 24f is located at the left-bottom corner of keyboard 18. Display protector 24 in computer device 210 further includes an upper portion 24b extending along the upper side of keyboard 18 and a bottom portion 24e extending along the bottom side of keyboard 18.

FIG. 2C illustrates an arrangement in which a display protector 24 in a computer device 230 continuously surrounds keyboard 18. In this example, display protector 24 may be formed as a resilient ring surrounding keyboard 18. The resilient ring is attached to keyboard body 12 so as to protect the display by contact therewith. The resilient ring may be formed as a single piece of elastomeric material. For example, the resilient ring may be shot in rubber.

Figure 3:
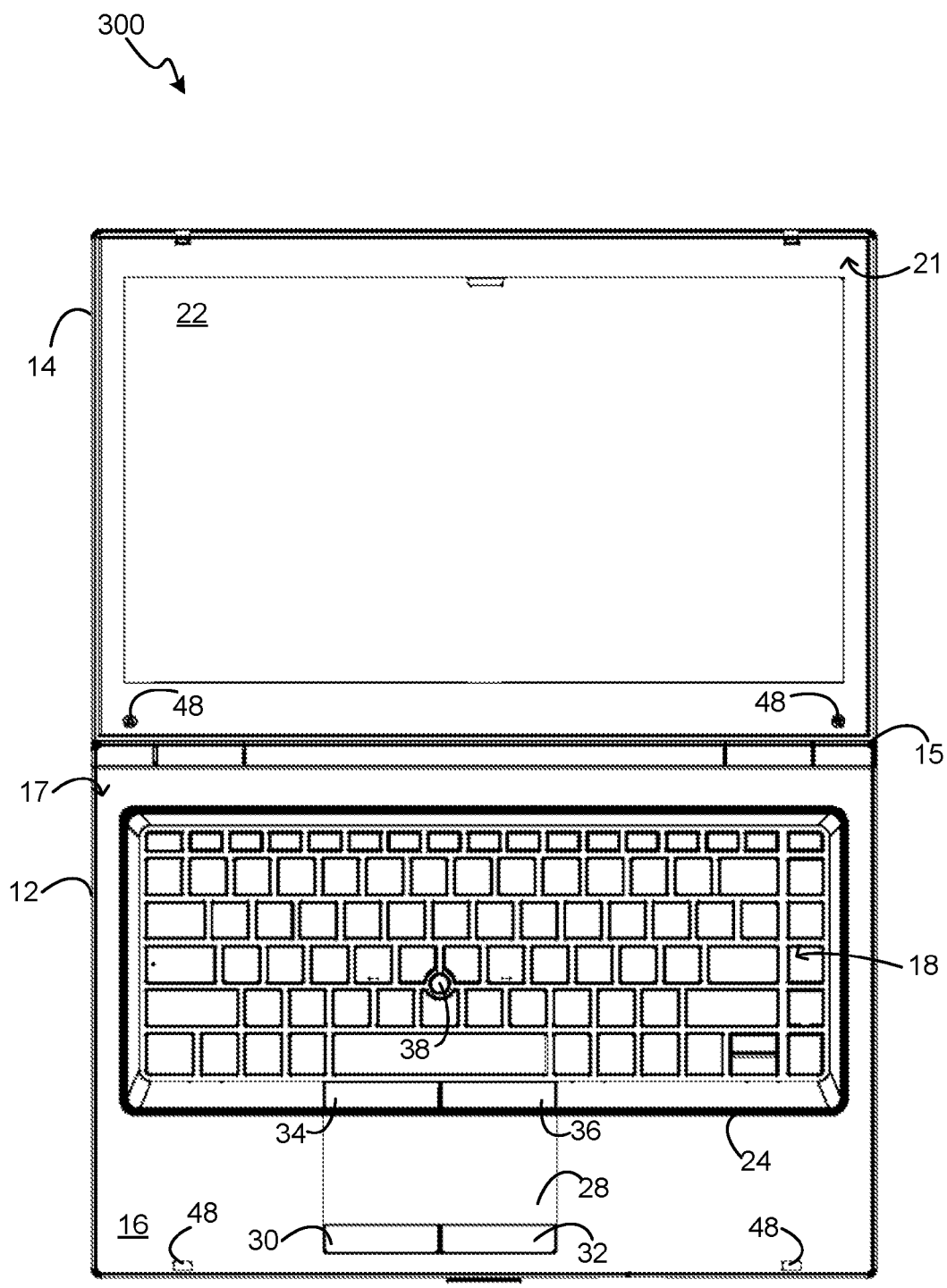
FIG. 3 is a schematic view of a computer device according to an example.

FIG. 3 is a schematic view of a computer device 300 according to an example. Apart from the elements detailed above, computer device 300 includes a trackpad 28 and, optionally, left and right buttons 30, 32. Trackpad 28 is a touch sensitive area that responds to the touch and movement of a user's finger. Generally, trackpad 28 assumes the functionality of a pointing device such as a mouse device or other similar devices. Left and right buttons 30, 32 may assume the functionality of the left and right buttons of a mouse device. As depicted in FIG. 3, keyboard 18 may include further left and right buttons 34, 36 as well as a further pointing device 38. Computer device 300 includes display protector 24 adjacent to elements of keyboard 18. Further, a display protector 24 is disposed in-between trackpad 28 and keyboard 18 and surrounding keyboard 18. Thereby, it is facilitated that display protector 24 does not hinder user operation of keyboard 18 and trackpad 28. As illustrated in the Figure, a computer device as described herein may include further protectors (e.g., protectors 48) that provide for facilitates keeping a minimum distance between a keyboard body and a display body when the laptop is closed.

FIG. 4 is a schematic side view of a computer device 400 in an open position according to an example. As illustrated by arrow 42, display body 14 is closable upon keyboard body 12 via a hinge 40 disposed at edge 15. In some examples herein, display protector 24 is mounted in a channel 26. If display protector 24 includes separate portions, channel 26 may includes channel portions for each separate portion of display protector 24. If display protector 24 continuously surrounds keyboard 18, channel 26 may be formed continuously around keyboard 18. A channel for mounting display protector 24 facilitates robustness of the attachment of display protector 24 to keyboard body 12. Channel 26 may be an open channel (i.e., without a bottom part) or a closed channel (i.e., with a bottom part). Further, channel 26 may include open and closed portions. Display protector 24 may be heat stacked to keyboard deck 16 from behind or from the front side of keyboard deck 16. As illustrated in FIG. 4, display protector 24 may protrude above keyboard deck 16. A protruding protector facilitates that display 22 does not contact elements on inner surface 17 of keyboard body 12.

As set forth above, display protector 24 is attached to keyboard body 12 and disposed so as to protect display 22 by contact therewith. That is, when computer device 230 is closed, display protector 24 faces display 22 so as to prevent contact of display 22 with other elements at keyboard body 12 when a load is applied to computer device 230. In the closed position, if no load is applied to the computer, display protector 24 may contact or not display 22 as illustrated in FIGS. 5A and 5B.

FIGS. 5A and 5B are schematic cross-sectional views of computer devices 510, 520 according to examples. The depicted views show a cross-section along a middles axis of a computer device such as a middle axis 46 shown in FIG. 1. In both examples, display protector 24 protrudes over keyboard deck 16 such that display protector 24 is the first point of contact of display 22 with elements of keyboard body 12. Thereby, display protector 24 protects display 22 against damage caused by contact with other elements of keyboard body 12.

FIG. 5A illustrates an example, in which the display protector does not contact display when the computer device is closed: display protector 24 does not contact display 22 at an unloaded closed position of computer device 510; if a sufficiently high compressible load is applied to computer device 510 (e.g., in the direction of arrow 44), display protector 24 contacts display 22 for protection thereof against contact with other elements of keyboard body 12.

Figure 6:
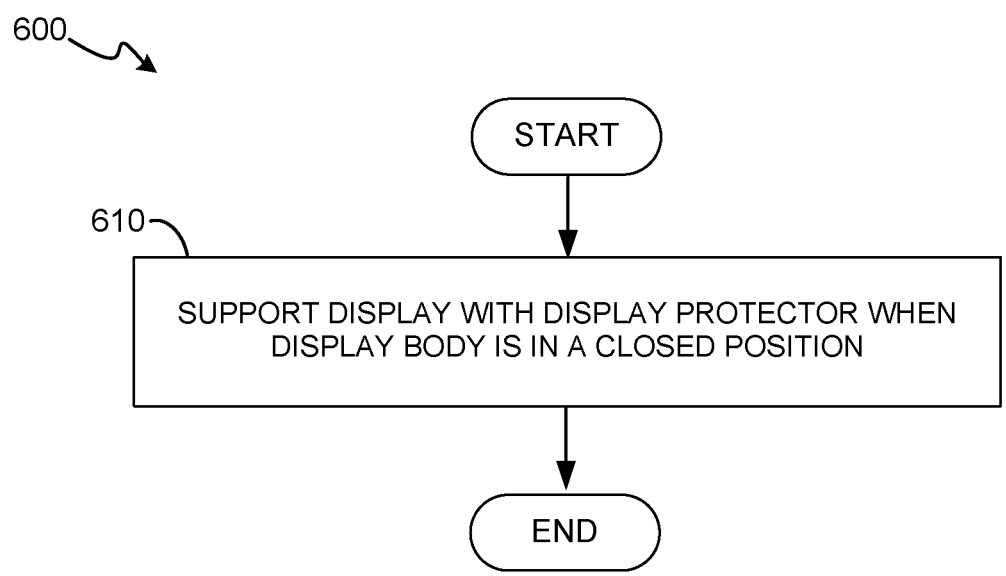
FIG. 6 is a flowchart of a method of preventing damage to a display according to an example.

FIG. 6 is a flowchart 600 of a method of preventing damage to a display according to examples and illustrated by FIG. 5B. The illustrated method prevents undesired contact of display 22 with other elements of keyboard body 12 other than display protector 24. The method is performed at a computer device including i) a keyboard body 12 with a keyboard 18, ii) a display body 14 with a display 22, and iii) a display protector 24. As set forth above, display protector 24 is attached to keyboard body 12 such that portions of display protector 24 are disposed in the neighborhood of each side of keyboard 18. At step 610, display 22 is supported with display protector 24 when display body 14 is in a closed position relative to keyboard body 12.

In the example shown in FIG. 5B, display protector 24 contacts display 22 when the computer device is closed. In this example, display protector 24 contacts display 22 even when no compressible force is applied onto computer device 520. Thereby, impacts of display 22 against display protector 24 while computer device 520 is closed may be prevented.

A method of manufacturing a computer device as described above may include rotatably coupling keyboard body 12 to display body 14 (e.g., via hinge 40) for enabling closing display body 14 upon keyboard body 12. Display protector 24 is attached to keyboard body 12 within an interior region of keyboard deck 16 so as to protect display 22 by contact therewith. As set forth above, display protector 24 includes portions at the left, right, top, and bottom of keyboard 18.

The examples described above provide methods and systems for preventing damage to the display of a foldable computer device caused by compressive loads applied to the closed device. In the accompanying figures and related passages of this description, a computer device is illustrated as a laptop (also referred to as notebook computer). However, it will be understood that a computer device includes other types of devices such as, but not limited to, personal digital assistants (PDAs), cellular telephones, or any other type of portable computer such as hand-held computers, tablet computers, and the like.

In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the disclosed examples.

What is claimed is:

1. A computer device, comprising:
   a keyboard body including a keyboard deck and a keyboard;
   a display body including a display, the display body being coupled to the keyboard body such that the computer device is foldable to a closed position; and
   a display protector attached to the keyboard body and disposed at the keyboard deck to protect the display by contact therewith;
   wherein the display protector includes a plurality of separate, discrete portions;
   wherein the plurality of portions extends along each side of the keyboard and are located on an inner surface of the keyboard body;
   wherein the plurality of portions do not contact the display when the computer device is in the closed position; and
   wherein the plurality of portions contact the display only when a compressible load is applied to the computer device while in the closed position.

2. The computer device of claim 1, wherein the display protector extends along at least 50% of an external perimeter of the keyboard.

3. The computer device of claim 1, wherein the display protector protrudes above the keyboard deck.

4. The computer device of claim 1, wherein the display protector is mounted in a channel.

5. The computer device of claim 1, wherein the display protector is resilient.

6. The computer device of claim 5, wherein the display protector is composed of an elastomeric material.

7. The computer device of claim 1, wherein the display protector is provided adjacent to the keyboard.

8. The computer device of claim 1, further comprising a trackpad, wherein at least one of the plurality of portions of the display protector extends between the keyboard and the trackpad.

9. The computer device of claim 1, wherein the computer device is a laptop.

10. A computer device, comprising:
    a keyboard body including a keyboard deck and a keyboard, the keyboard including an external perimeter;

a display body including a display, the display body being rotatably coupled to the keyboard body such that the computer device is foldable to a closed position; and a display protector extending along at least 50% but less than 100% of the external perimeter of the keyboard and attached to an inner surface of the keyboard body;

wherein the display protector does not contact the display while in the closed position, but contacts the display only when a compressible load is applied to the computer device while in the closed position so as to protect the display by contact therewith.

11. The computer device of claim 10, wherein the display protector is provided adjacent to the keyboard.

12. The computer device of claim 10, wherein the display protector is mounted so as to protrude above the keyboard deck.

13. The computer device of claim 10, wherein the display protector is resilient.

14. The computer device of claim 13, wherein the display protector is composed of an elastomeric material.

15. The computer device of claim 11, further comprising a trackpad, wherein the display protector extends between the keyboard and the trackpad.

16. The computer device of claim 10, wherein the computer device is a laptop.

17. A method of preventing damage to a display of a computer device, the method comprising supporting a display with a display protector when the computer device is folded to a closed position, wherein:

the computer device includes a display body, including the display, coupled to a keyboard body, including a keyboard, such that the computer device is foldable to the closed position;

the display protector is attached to the keyboard body, the display protector including a plurality of separate, discrete portions such that the plurality of portions of the display protector is disposed along each side of the keyboard and are located within an inner surface of the keyboard body;

the plurality of portions do not contact the display when the computer device is in the closed position; and the plurality of portions contact the display only when a compressible load is applied to the computer device while in the closed position.

18. The method of claim 17, wherein the computer device is a laptop.

* * * * *